United States Patent [19]

Rodriguez-Cavazos

[11] Patent Number: 4,829,216
[45] Date of Patent: May 9, 1989

[54] SCR REGULATOR FOR A TELEVISION APPARATUS

[75] Inventor: Enrique Rodriguez-Cavazos, Indianapolis, Ind.

[73] Assignee: RCA Licensing Corporation, Princeton, N.J.

[21] Appl. No.: 194,643

[22] Filed: May 16, 1988

[51] Int. Cl.⁴ .............................................. H01J 29/70
[52] U.S. Cl. .................................... 315/411; 358/190
[58] Field of Search ................ 315/408, 411; 358/190, 358/243

[56] References Cited

U.S. PATENT DOCUMENTS

| 3,629,686 | 12/1971 | Hendrikus et al. |
| 3,689,797 | 5/1972 | Hetterscheld et al. |
| 3,970,780 | 7/1976 | Minoura . |
| 4,163,926 | 8/1979 | Willis . |
| 4,190,791 | 2/1980 | Hicks . |

FOREIGN PATENT DOCUMENTS 2261670 9/1975 France .
2138224A 10/1984 United Kingdom .

OTHER PUBLICATIONS

Philips Technical Publication 130, C. H. J. Bergmans, entitled "Twin-Switch Power Pack for 110° Colour TV", *Electronic Components and Materials*, vol. 6, No. 1, 1984, pp. 48–54.

An Article in *Funkschau*, vol. 8, 1973, entitled, "A Switch Power Pack of Great Efficiency", by Eduard Gublass.

*Primary Examiner*—Theodore M. Blum
*Attorney, Agent, or Firm*—E. M. Whitacre; J. J. Laks; H. D. Fried

[57] ABSTRACT

In a switching power supply for a television apparatus, a switching stage is coupled to a source of DC input voltage and to an energy storage inductance for developing a source of DC supply voltage. Operation of the switching stage generates a switched waveform voltage in the inductance. The primary winding of a flyback transformer is coupled to and energized by the DC supply voltage. A second winding of the flyback transformer is coupled to the inductance and provides a magnetic path, via the flyback transformer, for energy to circulate between the source of DC supply voltage and the energy storage inductance. An auxiliary winding is magnetically coupled to the inductance and to a load circuit, such as a high power audio stage, for transferring at least a portion of the circulating energy to the load circuit. Additionally, the flyback transformer may be used to directly transfer energy to the load circuit.

26 Claims, 3 Drawing Sheets

SCR REGULATOR FOR A TELEVISION APPARATUS

This invention relates to a switching power supply for a television apparatus.

In a television receiver, the amount of power delivered by the flyback transformer to the audio load circuit is limited by two factors. The first is audio induced modulation of scan size and the second is temperature rise in the deflection semiconductor power components such as the horizontal output transistor. These limitations are especially severe when the television receiver uses an SCR regulator. Known but costly ways of overcoming these limitations include the use of a totally independent power supply when an audio output of more than approximately one watt per channel is required.

A feature of the invention is a power supply that is capable of providing power to a load circuit from energy circulating within the existing switching power supply. A first switch is coupled to a source of DC input voltage and to an energy storage inductance for developing a source of DC supply voltage. Operation of the first switch generates a switched waveform voltage in the inductance. A first winding of a supply transformer is coupled to and energized by the source of DC supply voltage. A second switch is coupled to the first winding and is synchronously operated with the first switch to generate a switched waveform voltage in a second winding of the transformer that is in synchronism with the switched waveform voltage in the inductance. The second winding is coupled to the inductance and provides via the supply transformer a magnetic path for circulating energy to circulate between the source of DC supply voltage and the energy storage inductance. An auxiliary winding is magnetically coupled to the energy storage inductance and to a load circuit for transferring at least a portion of the circulating energy to the load circuit.

In accordance with another feature of the invention, the energy supply requirement of a load circuit is shared between two switching power supply stages. A first switching stage is coupled to a source of DC input voltage and to a first transformer for generating first and second switched waveform voltages in first and second windings of the transformer. First and second filter stages are coupled to the first and second windings for developing respective first and second sources of DC supply voltage. A second switching stage is coupled to a first winding of a second transformer and to the first DC supply voltage for generating switched waveform voltages in the windings of the second transformer. A third filter stage is coupled to a second winding of the second transformer for developing a third source of DC supply voltage. The second and third sources of DC supply voltage are combined to develop a fourth source of DC supply voltage. A load circuit, such as the audio circuit, is energized by the fourth source from power jointly derived from the second and third sources of DC supply voltage.

Figure 1:
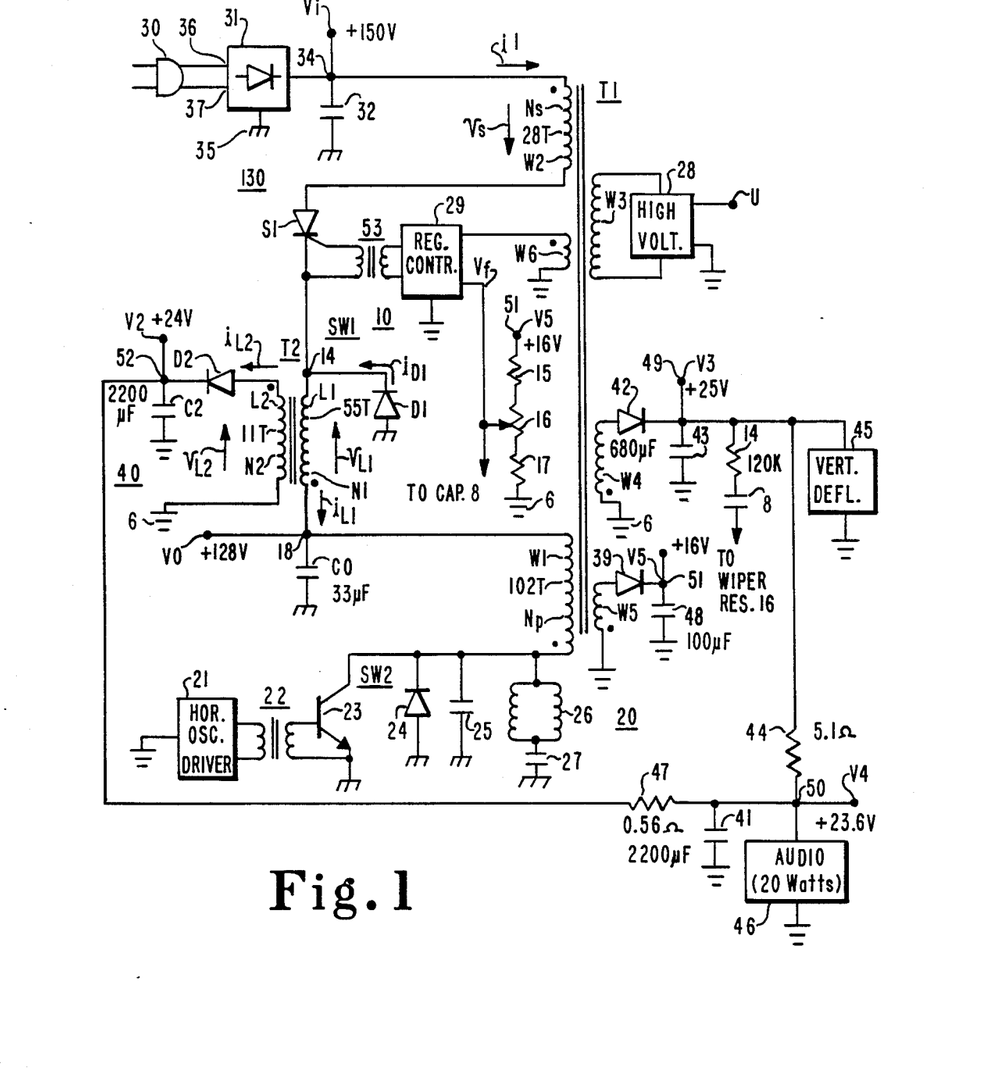
FIG. 1 illustrates a regulated switched power supply for a television apparatus, including an auxiliary power supply in accordance with the invention.

In FIG. 1, a switching power supply stage 10 of a television apparatus includes a DC input voltage source 130 comprising a source of AC mains voltage 30 coupled between input terminals 36 and 37 of a full wave bridge rectifier 31, for developing an unregulated DC input voltage $V_i$ between an output terminal 34 and a current return terminal 35. A capacitor 32 provides filtering of voltage $V_i$. Current return terminal 35 is designated as a hot ground, conductively nonisolated from AC mains source 30 with respect to electrical shock hazard.

Unregulated voltage $V_i$ is coupled to the anode of a controllable thyristor switching element SCR S1 of a switching stage SW1 via a winding W2 of a horizontal flyback supply transformer T1. One end of an energy storage inductance L1 is coupled to the cathode of SCR S1, the other end is coupled to a regulated B+supply terminal 18. A capacitor C0 provides filtering of a DC supply voltage supply V0 developed at terminal 18. A second switching element, diode D1 of switching stage SW1, has its anode coupled to the junction of SCR S1 and inductance L1, and its cathode grounded to hot ground 35.

DC supply voltage V0 is coupled to and energizes the primary winding W1 of flyback transformer T1. A horizontal deflection stage 20 is coupled to primary winding W1 and generates a switched waveform voltage retrace pulse $v_p$ at the dotted terminal of primary winding W1. Horizontal deflection circuit 20 includes a horizontal oscillator and driver 21, a retrace capacitor 25, series coupled horizontal deflection winding and S-shaping capacitor 27 and a trace switching arrangement SW2 comprising a horizontal output transistor 23 and a parallel damper diode 24. A driver transformer 22 provides hot-cold electrical isolation within deflection circuit 20.

Flyback transformer T1 includes secondary windings W3, W4 and W5 that are conductively isolated from AC mains source 30. Winding W3 is a high voltage winding that energizes a high voltage circuit 28 for providing an ultor accelerating potential at a terminal U. A rectifier 42 is coupled to the undotted terminal of winding W4 and conducts during the trace interval of each deflection cycle to generate a DC supply voltage V3 at a terminal 49 that is filtered by a capacitor 43. Voltage V3 powers such load circuits of the television receiver as vertical deflection circuit 45. The dotted terminal of secondary winding W4 is coupled to a ground reference potential 6 that is conductively isolated from AC mains source 30 with respect to electrical shock hazard isolation. A rectifier 39 is coupled to the undotted terminal of winding W5 and conducts during the trace interval of each deflection cycle to generate a DC supply voltage V5 at a terminal 51 that is filtered by a capacitor 48. Voltage V5 provides a supply voltage to several of the television receiver integrated circuits, not shown in FIG. 1. Other windings of flyback transformer T1, not illustrated in FIG. 1, may provide other supply voltages and synchronizing signals to various circuits of the television receiver.

To regulate the B+ supply voltage V0 and the flyback transformer derived DC voltages, a regulator control circuit 29 receives a feedback voltage $V_f$ representative of variations in the supply voltages. Feedback voltage $V_f$ is generated at the wiper arm of a resistor 16 that is part of a voltage divider, resistors 15, 16 and 17, coupled between voltage terminal 51 and cold ground 6.

Regulator control circuit 29 generates gating pulses that are applied to SCR S1 via a coupling transformer 53 that also serves as a hot-cold isolation barrier. To synchronize the switching of SCR S1 and diode D1 with operation of trace switching arrangement SW2, a retrace pulse voltage is coupled to regulator control circuit 29 from a flyback transformer winding W6.

In operation, regulator control circuit 29 turns on SCR S1 at a controllable instant t3 within the trace interval of a horizontal deflection period t1–t8 of the solid-line waveform FIGS. 2a–2g. With SCR S1 conducting, the cathode voltage at terminal 14 equals the algebraic sum of the input voltage $V_i$ and the positive trace voltage $v_t$ (idealized as having a constant value $V_T$) of the flyback secondary winding voltage $v_s$ illustrated in FIG. 2a. The voltage $V_{L1}$, illustrated in FIG. 2b, developed across regulator inductance L1, equals the difference in voltage between the voltage at terminal 14 and the voltage V0 developed at regulated B+ supply terminal 18. From time t3 to the end of the trace interval near time t4, voltage $v_{L1}$ is positive and of relatively constant level $V_B$. Voltage $v_{L1}$ produces an upward ramp of current $i_{L1}$ in inductance L1 that flows from terminal 34 as an input current i1, illustrated in FIG. 2c. Near the beginning of retrace, near time t4, input current i1 and thus current $i_{L1}$ in inductance L1 has reached a peak value $I_{LM1}$.

During the retrace interval, voltage $v_s$ in flyback winding W2 is a negative going pulse voltage $v_r$ of peak magnitude $V_P$ relative to AC zero. From the beginning of retrace, near time t4, until a later time t5 within retrace, voltage $v_{L1}$ across inductance L1 follows in waveform the downwardly going retrace pulse voltage $v_r$. During the interval t4–t5, input current i1 stops increasing and begins to decrease slightly as voltage $V_{L1}$ reverses polarity under the influence of retrace pulse voltage $v_r$.

Near time t5, voltage $v_{L1}$ has decreased to a negative value $-V_A$ equal in magnitude to regulated B+ voltage V0 plus $1V_{be}$ diode voltage drop. The voltage at terminal 14, the junction of the cathodes of SCR S1 and diode D1, is just below ground potential, causing the diode to become conductive and take up the current flow in inductance L1. With diode D1 conducting near time t5, as illustrated by the diode current $i_{D1}$ of FIG. 2d, the cathode of SCR S1 is clamped to near ground potential. The anode voltage, however, continues to decrease under the influence of the negative retrace pulse voltage $v_r$. SCR S1 quickly becomes nonconductive near time t5 due to the reverse biasing of the anode-to-cathode main current path in the SCR, as illustrated in FIG. 2c by the input current i1 going to zero near time t5.

With diode D1 conducting, voltage $v_{L1}$ is clamped to a negative voltage having a magnitude equal to the regulated B+ supply voltage level V0 plus $1V_{be}$. The current $i_{L1}$ in inductance L1 is a downwardly ramping current waveform illustrated by diode current $i_{D1}$ of FIG. 2d. Near time t7, the current in inductance L1 has decreased to zero and diode D1 becomes reverse biased as the current attempts to reverse direction. No current flows in inductance L1 after time t7 until regulator control circuit 29 gates SCR S1 into conduction at a controllable instant during the trace interval of the next deflection cycle.

To regulate the B+ supply voltage and the output voltages of flyback transformer T1 against load and AC line variations, regulator control circuit 29 varies the turn on instant of SCR S1 within the trace interval in accordance with the feedback voltage $V_f$.

The energy transfer and power flow within main power supply 10 of FIG. 1 will now be described. During the intervals t1–t3 and t5–t8, SCR S1 is nonconductive, and no input current i1 flows from supply terminal 34. During these intervals, there is no transfer of energy out of input voltage source 130.

From time t3, when SCR S1 is turned on, until the end of the trace interval, near time t4, an upramping current i1 flows from unregulated input terminal 34, through flyback transformer winding W2, through SCR S1 and inductance L1, towards regulated B+ supply terminal 18. During this interval, energy is being supplied by input voltage source 130 and energy is being stored in inductance L1. Within the brief interval t4–t5 near the beginning of retrace, energy is being removed from inductance L1 by the decreasing current $i_{L1}$.

During the early part of the trace interval, energy is flowing into horizontal B+ filter capacitor C0 from flyback transformer primary winding W1 when primary winding current $i_p$ is negative. During the interval t3–t4 when inductance current $i_{L1}$ is reflected into primary winding current $i_p$, energy is flowing out of B+ filter capacitor C0.

During trace, between times t1–t4, regulated B+ voltage V0 is applied by trace switch SW2 across flyback transformer primary winding W1, with the undotted terminal of the winding being positive relative to the dotted terminal. Applied voltage V0 develops an upramping magnetizing current component to primary winding current $i_p$, as indicated in FIG. 2e by current $i_{pa}$ between times t1 and t3. After time t3, when SCR S1 is conductive, current i1 flowing in secondary winding W2 adds an additional component to the primary winding current due to the tight transformer coupling of windings W1 and W2. As illustrated in FIGS. 2c and 2e, during the interval t3–t5, when SCR S1 is conducting, current i1 is stepped down in accordance with the turns ratio Ns:Np of transformer T1. The portion $i_{pb}$ of primary winding current $i_p$, therefore, includes both a magnetizing current component and a transformer coupled current component generated by input current i1. Omitted from illustration in FIG. 2e is that component of the primary winding current that is generated by flyback transformer trace rectified supplies.

During the early portion of the trace interval, when primary winding current $i_p$ is negative and the undotted terminal of primary winding W1 is positive, energy is flowing out of the primary winding into B+ supply terminal 18 to be stored in filter capacitor C0. During the later portion of the trace interval, when both primary winding current $i_p$ and the voltage at the undotted terminal of the primary winding are positive, energy is flowing out of B+ supply terminal 18 into primary winding W1. Part of this energy is stored in the flyback transformer in the form of increasing amplitude magnetizing current.

During the retrace interval, between times t4 and t8, the primary winding current is a generally resonant waveshape current $i_{pc}$, illustrated in FIG. 2e. The peak magnitude $I_{M1}$ at the beginning of retrace is greater than the peak magnitude $I_{M2}$ at the end of retrace, indicating a net transfer of energy via the flyback transformer to retrace driven load circuits, principally high voltage load circuit 28.

Because flyback transformer secondary winding W2 is coupled in series with SCR S1, the secondary winding also acts as a source of energy during the interval t3–t4 within trace when SCR S1 is conducting input current i1. As noted from FIGS. 2a and 2c, positive current i1 flows into the dotted terminal of secondary winding W2, which terminal is at a negative voltage during trace with respect to the undotted terminal. Energy, therfore, flows out of winding W2 towards inductance L1 and B+ supply terminal 18.

The energy flowing out of secondary winding W2 is being supplied via the magnetics of flyback transformer T1 from the energy flowing into primary winding W1 from B+ supply terminal 18. Thus, in main power supply 10, a circulating energy is created that circulates in a closed loop between primary winding W1 and secondary winding W2 via the magnetics of flyback transformer T1 and via the current path through SCR S1 and inductance L1. During the brief interval t4–t5 near the beginning of retrace, energy flows out of secondary winding W2 towards terminal 18 when voltage $v_r$ of FIG. 2a is positive, and energy flows into winding W2 from inductor L1 when voltage $v_r$ is negative.

In accordance with an aspect of the invention, the energy circulating between primary winding W1 and secondary winding W2 may be utilized by an auxiliary power supply 40 to provide substantial power to a television receiver load circuit such as audio circuit 46 of FIG. 1. In carrying out this aspect of the invention, an auxiliary winding L2 is magnetically coupled to inductance L1 and wound around a common core to form an auxiliary supply transformer T2 that also serves as an electrical shock hazard isolation barrier.

With the winding polarities of windings L1 and L2 as shown in FIG. 1, the undotted terminal of winding L2 is coupled to isolate ground 6 and the dotted terminal is coupled to the anode of a rectifier D2. A filter capacitor C2 is coupled to the cathode or rectifier D2 at a auxiliary supply terminal 52. Supply terminal 52 is coupled to an audio B+ supply terminal 50 via a relatively small current limiting resistor 47. A filter capacitor 41 is coupled to audio B+ supply terminal 50.

Figure 2:
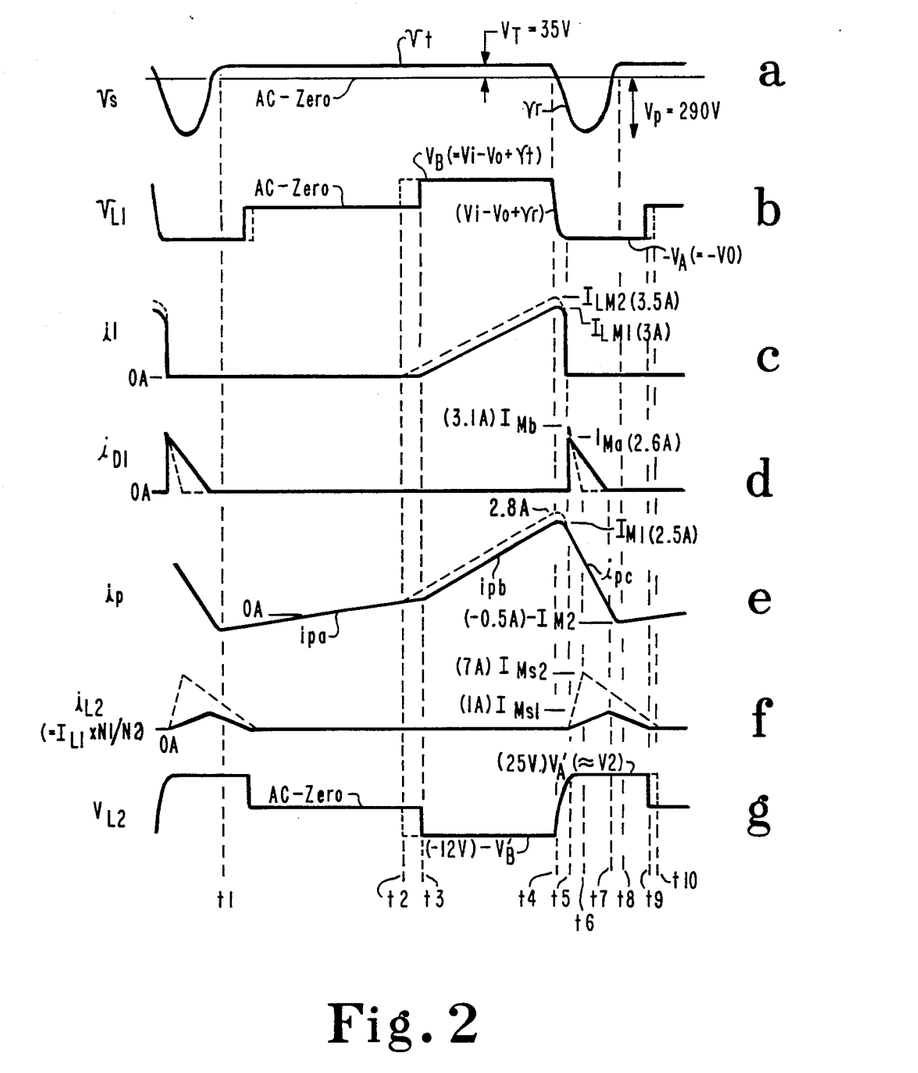
FIGS. 2a-2g illustrate waveforms useful in explaining operation of the circuitry of FIG. 1.

In operation, when SCR S1 is conductive within each deflection cycle, during the interval t3–t5 of FIG. 2, the dotted terminal of winding L1 is negative relative to the undotted terminal, producing a negative voltage $v_{L2}$ of level $-V'_B$ at the dotted terminal of winding L2, as illustrated in FIG. 2g. During the interval t4–t5 near the beginning of retrace, voltage $v_{L2}$, being the transformed voltage of voltage $v_{L1}$, follows in waveshape an opposite polarity version of voltage $v_r$ of FIG. 2a.

After time t5, retrace pulse voltage $v_r$ cuts off conduction in SCR S1 and diode D1 takes over current flow in winding L1. The regulated B+ supply voltage V0 is impressed by diode D1 across winding L1 and by transformer action develops a positive voltage $v_{L2}$ of amplitude $V'_A$ after time t5, as illustrated in FIG. 2g. Diode D2 becomes forward biased and charges filter capacitor C2 to develop an auxiliary DC supply voltage V2 at terminal 52 equal to voltage level $V'_A$ less $1V_{be}$.

Figure 3:
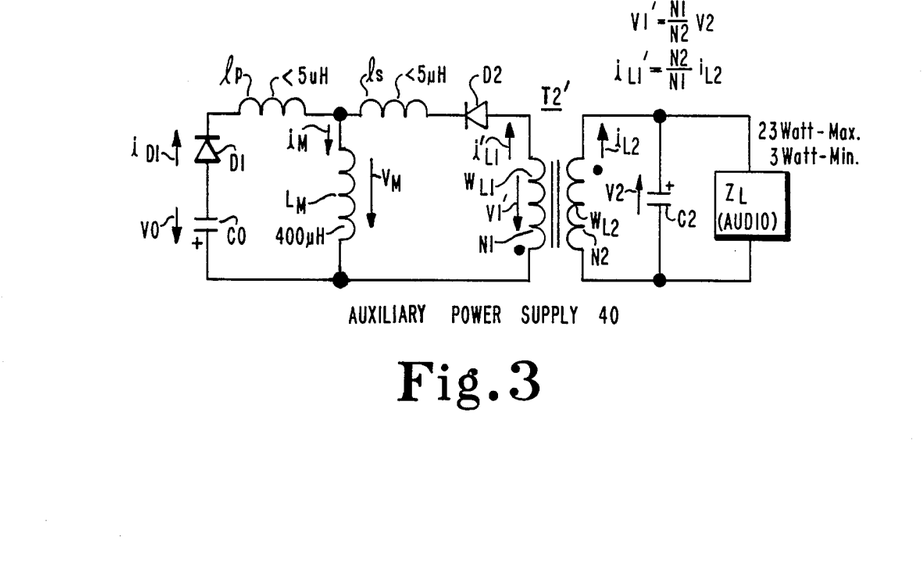
FIG. 3 illustrates the transformer equivalent circuit of the auxiliary power supply of FIG. 1.

Operation of auxiliary power supply 40 will now be explained with the aid of its electrical equivalent circuit illustated in FIG. 3. In FIG. 3, an ideal transformer T2' includes a primary winding $W_{L1}$, corresponding to winding L1 of FIG. 1, and having the same number of turns N1. Transformer T2' includes a secondary winding $W_{L2}$, corresponding to winding L2, and having the same number of turns N2. Inductance $l_p$ corresponds to the primary leakage inductance of transformer T2 of FIG. 1, inductance $l_s$ corresponds to the secondary leakage inductance of transformer T2 reflected back to the primary, and inductance $L_m$ corresponds to the shunt or magnetizing inductance of transformer T2. Diode D2 in FIG. 1 has been transformed to the primary side in FIG. 3 and is in series with secondary leakage inductance $l_s$. Diode D1 in FIG. 1 is shown in FIG. 3 as being in series with primary leakage inductance $l_p$. Generalized impedance $Z_L$ corresponds to the audio load coupled to terminal 52 of FIG. 1.

Current $i_{L2}$ of FIG. 1 is shown in FIG. 3 as flowing in ideal transformer secondary winding $W_{L2}$. This current is transformed into a primary winding current $i'_{L1}$ flowing an ideal transformer primary winding $W_{L1}$ and in secondary leakage inductance $l_s$. The diode current $i_{D1}$ of FIG. 1 is shown in FIG. 3 as flowing in primary leakage inductance $l_p$. A magnetizing current $i_m$ may be defined in the transformer equivalent circuit of FIG. 3 as flowing in magnetizing inductance $L_m$ and equals the algebraic sum of diode current $i_{D1}$ and the transformed version $i'_{L1}$ of secondary winding current $i_{L2}$.

The transformer equivalent circuit of FIG. 3 comes into existence at time t5 of FIG. 2, when SCR S1 is cutoff by retrace pulse voltage $v_r$ and diode D1 takes over current conductance. Thus, at time t5 of FIG. 2d, current $i_{D1}$ of FIG. 3 is at a maximum value $I_{Ma}$ equal in magnitude to the current in SCR S1 at its cutoff instant. Secondary winding current $i_{L2}$ and its reflected current $i'_{L1}$ are both zero prior to time t5 due to the blocked state of diode D2.

At time t5, when diode D1 becomes conductive, voltage V0 developed cross capacitor C0 is applied to winding $W_{L1}$ of FIG. 3 via the T-network impedance ($l_p$, $L_m$, $l_s$) to develop voltage V1' across winding $W_{L1}$, where the dotted terminal of the winding is made positive. With diode D1 conducting at time t5, voltage V0 developed across capacitor C0 is impressed across the series coupled inductances $l_p$ and $L_m$.

Because magnetizing inductance $L_m$ is much larger than primary leakage inductance $l_p$, voltage $V_m$ developed across the magnetizing inductance is nearly equal to voltage V0. Because of the loading effects by audio load $Z_L$, auxiliary supply voltage V2 and thus the transformed auxiliary supply voltage V1' is even lower in magnitude than voltage $V_m$. Transformed current $i'_{L1}$ begins to flow at time t5 through forward biased diode D2 and through transformed secondary leakage inductance $l_s$ and magnetizing inductance $L_m$. As illustrated in FIG. 2f, the transformed current $i'_{L1}$ begins to ramp up at time t5 with a slope that is determined in accordance with the difference in voltage between voltage $V_m$ and voltage V1' and in accordance with the value of transformed secondary leakage inductance $l_s$. As current $i'_{L1}$ of FIG. 2f ramps up, current $i_{D1}$ of FIG. 2d ramps down, with the sum of the two currents being equal to magnetizing current $i_m$.

At time t7, current in diode D1 in FIG. 3 has ramped down to zero and the diode becomes reverse biased, removing voltage V0 and primary linkage inductance $l_p$ from the remainder of the circuit. After time t7, the transformed auxiliary supply voltage V1' is impressed across the series arrangement of magnetizing inductance $L_m$ and transformed secondary leakage inductance $l_s$. Current $i'_{L1}$ in winding $W_{L1}$ begins ramping down to zero from its peak magnitude, reaching zero at time t9 of FIG. 2f, at which time diode D2 becomes blocked. During the interval t5–t9 when transformed current $i'_{L1}$ flows, capacitor C2 is charged by secondary winding current $i_{L2}$ to replenish charge lost to audio load $Z_L$.

In accordance with a feature of the invention, auxiliary power supply 40 inherently provides load regulation of auxiliary supply voltage V2 when the power supply is used in conjunction with a main power supply 10 that regualtes horizontal B+ supply voltage V0.

Consider an example of increased audio loading from e.g. 3 watts to e.g. 23 watts. The dashed-line waveforms in FIG. 2 apply to such a situation. To provide the additional audio load power from input supply 130 while maintaining regulated B+ voltage V0 unchanged, regulator control circuit 29 turns on SCR S1 at the earlier instant t2 of FIG. 2c. Input current i1 ramps up for a longer interval within trace, reaching a higher peak magnitude $i_{Lm2}$, indicating more stored energy in inductor L1 at time t5 when SCR S1 is cutoff and diode D1 takes up the current flow. As illustrated in the dashed-line waveform of current $i_{D1}$ in FIG. 2d, the peak diode current $i_{Mb}$ at time t5 is increased over the solid-line waveform, light loading situation.

At time t5, when the transformer equivalent circuit of FIG. 3 is created, the transformed auxiliary supply voltage V1' tends to be of decreased magnitude due to the increased audio loading. In contrast, B+ supply voltage V0 and thus magnetizing voltage $V_m$ tend to remain stabilized by operation of main power supply 10. The voltage impressed across transformed secondary leakage inductance $l_s$, being the difference in voltage between magnetizing voltage $V_m$ and transformed auxiliary supply voltage V1', is a greater impressed voltage under heavy audio loading than under light audio loading. Because of the greater impressed voltage, current $i'_{L1}$ and corresponding current $i_{L2}$ ramp up at a much greater rate under heavy loading than under light loading, as noted in FIG. 2f by comparing the dashed-line waveform with the solid-line waveform.

Since magnetizing current $i_m$ equals the sum of currents $i_{D1}$ and $i'_{L1}$, the rapid upramp of current $i'_{L1}$ results in a rapid downramp of current $i_{D1}$ from its peak value $i_{Mb}$, as illustrated by the dashed-line waveform in FIG. 2d. This current, under heavy loading conditions, reaches zero at a much earlier time, time t6.

At time t6, diode D1 becomes blocked and currents $i'_{L1}$ and $i_{L2}$ begin their downramping from time t6 until time t10, at which time diode D2 becomes blocked. One notes from FIG. 2f, that under heavy loading, current $i_{L2}$ ramps up to a much greater peak magnitude $I_{Ms2}$ and after time t6 ramps down at a rate mainly determined by the values of transformed auxiliary supply voltage V1' and the inductance of magnetizing inductance $L_m$. The inductance of transformed secondary leakage inductance $l_s$, being much smaller than magnetizing inductance $L_m$, has very little influence on the rate that currents $i'_{L1}$ and $i_{L2}$ ramp down.

The amount of energy transferred to auxiliary supply capacitor C2 to replenish losses incurred in audio load $Z_L$ is represented by the area under the curve $i_{L2}$ of FIG. 2f. The area under the dashed-line waveform of current $i_{L2}$, representing a heavy audio loading situation, is greater than the area under the solid-line waveform, representing a light loading condition.

Similarly, the area under the waveform of current $i_{D1}$ of FIG. 2d represents energy returned to B+ filter capacitor C0. This energy is obtained from the energy stored in inductor L1 at time t5 when SCR S1 becomes cutoff. Under heavy loading, the amount of energy supplied to B+ filter capacitor C0 is smaller than the amount of energy supplied under light loading.

The energy stored in inductor L1 at time t5, is completely removed from the inductor by the time diode D2 in auxiliary power supply 40 becomes blocked. The energy removed from inductor L1 goes to two places. Part of the energy goes to B+ filter capacitor C0 when the capacitor is charged by diode current $i_{D1}$, and the remaining part goes to auxiliary supply capacitor C2 when that capacitor is charged by current $i_{L2}$.

Comparing the dashed-line waveforms of FIGS. 2d and 2f with the solid-line waveforms, one notes that under heavy loading, more of the energy stored in inductance L1 at time t5 goes to auxiliary supply capacitor C2 to replenish the heavy load losses than is supplied to B+ filter capacitor C0. Under light loading, the reverse is true; more of the stored energy is supplied to B+ filter capacitor C0 and less goes to auxiliary supply capacitor C2.

The design parameters of transformer T2 in auxiliary power supply 40 are such as to automatically maintain auxiliary supply voltage V2 well regulated over a wide range of audio loading from minimal audio loading of e.g. 3 watts to heavy audio loading of e.g. 23 watts. Inherent in the transformer equivalent circuit of auxiliary power supply 40 in FIG. 3 is the large increase in auxiliary supply current $i_{L2}$ in response to a very small load induced decrease in auxiliary supply voltage V2. For example, under light audio loading, auxiliary supply voltage V2 may equal a value of 25 volts; whereas, under heavy audio loading, voltage V2 may decrease by only one or two volts to a level of 24 or 23 volts.

The amount of audio loading may be increased until a point is reached where pratically all of the energy stored in inductor L1 at time t5 goes to auxiliary supply capacitor C2 and none is supplied to B+ filter capacitor C0. When this point is reached, any further increase in audio loading does not result in more energy being transferred to capacitor C2. Under these circumstances, auxiliary supply voltage V2 decreases rapidly as more energy is being removed from capacitor C2 than is being supplied to the capacitor.

In accordance with a feature of the invention, the maximum amount of energy that may be supplied by auxiliary power supply 40 is enhanced by the presence of flyback transformer secondary winding W2 being in-circuit with SCR S1. When SCR S1 is conducting, input current $i_1$ flows in inductor L2. This current must of necessity also flow in winding W2.

The upramping input current i1 stores energy in inductor L1 for subsequent transfer out after time t5. A source of this energy is input voltage source 130; another source is the circulating energy that circulates from regulated B+ supply terminal 18 to primary winding W1 and then into secondary winding W2 via the magnetics of flyback transformer T1. This circulating energy is then routed to inductor L1.

The amount of energy stored in inductor L1 is greater than the amount of energy being supplied to it solely by input source 130. Advantageously, the greater stored energy in inductor L1, derived from the circulating energy, is able to support a greater maximum audio loading.

The amount of energy stored in inductor L1 at time t5 is least under conditions of low AC mains supply voltage and light beam current loading on flyback transformer T1. In such a situation, heavy audio loading may tend to reach or exceed the design limit of auxiliary power supply 40, tending to cause auxiliary supply voltage V2 and thus audio B+ supply voltage V4 at terminal 50 to decrease more than may be desirable.

In accordance with another feature of the invention, power for dynamically varying audio load circuit 46 of FIG. 1 may be derived jointly from auxiliary power supply 40 and main power supply 10. To accomplish this result, a flyback transformer secondary supply voltage such as vertical B+ supply voltage V3 is coupled to audio B+ supply terminal 50 via a current limiting resistor 44. Resistor 44 is coupled between vertical B+ supply terminal 49 and audio B+ supply terminal 50.

As the need arises, current may be supplied to audio B+ supply terminal 50 either from auxiliary supply terminal 52 via the small valued current limiting resistor 47 or may be supplied from vertical B+ supply terminal 49 via the small valued current limiting resistor 44. Current limiting resistor 47 is made significantly smaller than current limiting resistor 44, e.g. 5 to 10 times smaller. Vertical B+ supply voltage V3 is designed to have a nominal value close to that of audio B+ supply voltage V4. Choosing the vertical B+ supply voltage as the supplemental voltage is advantageous from the point of view of being a high power supply source of approximately the same voltage level as the audio B+ supply voltage.

Under all but the most extreme loading by audio load circuit 46, load current and power flows mainly from auxiliary supply terminal 52 via the smaller valued resistor 47. At the maximum or limit load condition, when voltage V2 at auxiliary supply terminal 52 tends to begin decreasing significantly, vertical B+ supply terminal 49 provides a substantial amount of the load current via resistor 44. Thus, even under extreme audio loading conditions, audio B+ supply voltage V4 may be maintained relatively stable by the additional supply voltage source available via resistor 44.

The values for voltages V2, V3 and V4 illustrated in FIG. 1 are for heavy audio loading of 23 watts. Approximately two-thirds of the load current and power flows from auxiliay supply winding L2 via terminal 52, and one-third flows from flyback transformer secondary winding W4 via terminal 49. The relative contributions of power to audio load circuit 46 from supply terminals 52 and 49 may be changed by adjusting the values of resistors 47 and 44.

For light audio loading of around three watts, the approximate voltage values are as follows: voltage V2=25.5V, voltage V3=25V, and voltage V4=25.4V. Audio B+ supply voltage V4 is slightly greater than vertical B+ supply voltage V3, indicating that a slight amount of current is flowing from auxiliary supply terminal 52 to vertical B+ supply terminal 49 via audio B+ supply terminal 50. In this situation all the audio load power is being supplied by auxiliary power supply 40. By changing the parameters of auxiliary power supply 40, such as the turns ratio of transformer T2 or the values of resistors 47 and 44, audio B+ supply voltage V4 will remain slightly lower than vertical B+ supply voltage V3 at light audio loading. Nearly 100 percent of the power may still be supplied via auxiliary supply terminal 52.

The increased loading on vertical B+ supply terminal 49 due to the heavy audio loading tends to increase the AC ripple across vertical B+ filter capacitor 43. The vertical amplifier negative feedback circuitry within vertical deflection 45 may be unable to respond fast enough to the audio load induced ripple to avoid undesirable modulation of the vertical deflection amplitude and of the raster height.

In accordance with a further aspect of the invention, the ripple voltage developed across vertical B+ filter capacitor 43 is AC coupled to regulator control circuit 29 via a resistor 14 and a capacitor 8 that are coupled in series between vertical B+ supply terminal 49 and the wiper arm of resistor 16. The AC ripple across capacitor 43 contributes a component to feedback voltage $V_f$ that modulates the turn-on time of SCR S1 in such a manner as to modify regulated B+ voltage V0 in a direction to cancel out the audio induced ripple. The horizontal rate switching of SCR S1 is sufficiently fast in frequency to enable auxiliary power supply 10 to follow and compensate for the audio induced ripple in vertical B+ supply voltage V3.

WHAT IS CLAIMED:

1. A switching power supply for a television apparatus, comprising:
   a source of DC input voltage;
   an energy storage inductance;
   a first switching arrangement coupled to said DC input voltage and to said inductance for developing a first source of DC supply voltage, operation of said first switching arrangement generating a first switched waveform voltage in said inductance;
   a supply transformer having a first winding coupled to and energized by said first source of DC supply voltage;
   a second switching arrangement coupled to said first winding and synchronously operated with said first switching arrangement to generate a second switched waveform voltage in said first winding synchronized with the first switched waveform voltage;
   a second winding of said supply transformer coupled to said inductance for providing via said supply transformer a magnetic path for circulating energy to circulate between said first source of DC supply voltage and said energy storage inductance;
   a load circuit; and,
   an auxiliary winding magnetically coupled to said energy storage inductance and coupled to said load circuit for transferring at least a portion of said circulating energy to said load circuit.

2. A power supply according to claim 1 wherein said load circuit comprises a dynamically varying audio circuit.

3. A power supply according to claim 1 further comprising a supply winding on said supply transformer and a rectifier and filter stage coupled to said supply winding for developing a second source of DC supply voltage, said second source of DC supply voltage being coupled to said load circuit for transferring energy thereto supplemental to said portion of said circulating energy.

4. A power supply circuit according to claim 3 further comprising an auxiliary rectifier and filter stage coupled to said auxiliary winding for developing a third source of DC supply voltage coupled to said load circuit for transferring said portion of said circulating energy via said third source.

5. A power supply according to claim 4 wherein said load circuit comprises a dynamically varying audio circuit.

6. A power supply according to claim 5 wherein said second source of DC supply voltage is coupled to a vertical deflection circuit and supplies power thereto.

7. A power supply according to claim 6 wherein said second and third sources of DC supply voltage each supply substantial amounts of power to said audio circuit via respective small-valued resistors.

8. A power supply according to claim 1 wherein said first switching arrangement comprises a first switching element that when conductive, provides a path for current between said source of DC input voltage and said energy storage inductance, and when nonconductive, disconnects said source of DC input voltage from said inductance; and, further comprising a second switching element that takes up current in said inductance when said first switching element is nonconductive.

9. A power supply according to claim 8 wherein said first switching element comprises a thyristor and said second switching element comprises a diode.

10. A power supply according to claim 8 wherein a switched waveform voltage in said second winding is applied to a main current path of said first switching element for reverse biasing said current path upon a reversal in polarity of said second winding voltage.

11. A power supply according to claim 10 wherein said supply transformer comprises a horizontal flyback transformer and said second switching arrangement comprises a horizontal deflection trace switch.

12. A power supply according to claim 8 further comprising a third switching element for coupling said load circuit to said auxiliary winding, said third switching element being conductive when said first switching element is nonconductive.

13. A power supply according to claim 12 wherein said second switching element, when conductive, couples said first source of DC supply voltage across said inductance.

14. A switching power supply for a television apparatus, comprising:
   a source of DC input voltage;
   a source of a deflection rate voltage;
   an energy storage inductance;
   a controllable switching element having a main current path coupled to said source of DC input voltage and to said inductance;
   a deflection rate pulse transformer coupled to said inductance and to a first load circuit;
   a control circuit coupled to said controllable switching element for switching said main current path to the conductive state each deflection cycle at a controllable instant within a first polarity interval of said deflection rate voltage to store in said inductance a controllable amount of energy from both sources;
   a second switching element coupled to said main current path, to said source of a deflection rate voltage, and to said inductance for switching said main current path to the nonconductive state during an opposing polarity interval of said deflection rate voltage, the energy stored in said inductance being depleted during said opposing polarity interval to replenish, via said pulse transformer, losses sustained in said first load circuit;
   a supply winding magnetically coupled to said energy storage inductance; and,
   a rectifier circuit coupled to said supply winding and to a second load circuit and poled for conduction during said opposing polarity interval of said deflection rate voltage for further depleting the energy stored in said inductance to replenish, via said supply winding, losses sustained in said second load circuit.

15. A switching power supply for a television apparatus, comprising:
   a source of DC input voltage;
   a first transformer coupled to said source of DC input voltage and having first and second windings;
   a first switching stage coupled to said first transformer for generating first and second switched waveform voltages in said first and second windings;
   first and second filter stages coupled to said first and second windings respectively for developing respective first and second sources of DC supply voltages;
   a second transformer having first and second windings;
   a second switching stage coupled to the first winding of said second transformer and to said first DC supply voltage for energizing said second transformer to generate switched waveform voltages in the first and second windings of said second transformer;
   a third filter stage coupled to said second winding of said second transformer for developing a third source of DC supply voltage;
   means for combining said second and third sources of DC supply voltage to develop a fourth source of DC supply voltage; and,
   a dynamically varying load circuit energized by said fourth source of DC supply voltage and being supplied by power derived jointly from said second and third sources of DC supply voltage, such that under heavy loading both said second and third sources of DC supply voltage supply substantial amounts of power to said load circuit.

16. A switching power supply according to claim 15 wherein said load circuit comprises a high power audio circuit.

17. A switching power supply according to claim 16 wherein said third source of DC supply voltage is coupled to a vertical deflection circuit and supplies power thereto.

18. A switching power supply according to claim 15 wherein the power being supplied to said load circuit is supplied mainly by said second source of DC supply voltage.

19. A switching power supply according to claim 15 wherein, under light loading, said second source of DC supply voltage supplies at least substantially all of the power being supplied to said load circuit.

20. A switching power supply according to claim 15 wherein said second transformer comprises a horizontal flyback transformer and said second switching stage comprises a horizontal deflection circuit, and wherein the power supplied to said load circuit by said third source of DC supply voltage flows from said first winding of said flyback transformer to said second winding thereof and bypasses the second winding of said first transformer.

21. A switching power supply according to claim 20 wherein said flyback transformer comprises a third winding and said first switching stage comprises a thyristor coupled in a series arrangement with the third winding of said flyback transformer and the first winding of said first transformer, a retrace pulse voltage in said third winding being applied to a thyristor main current path to turn off the thyristor.

22. A switching power supply according to claim 21 further comprising a rectifier coupled to said first winding of said first transformer to take up current conduction when said thyristor is turned off.

23. A switching power supply according to claim 15 wherein said combining means comprises first and second small valued resistors respectively coupled at first terminals thereof to said second and third sources of DC supply voltage and respectively coupled at second terminals thereof to a junction terminal with said fourth source of DC supply voltage.

24. A switching power supply circuit according to claim 23 wherein said first resistor is smaller in value than said second resistor such that power is being supplied to said load circuit mainly by said second source of DC supply voltage.

25. A switching power supply according to claim 24 wherein said load circuit comprises a high power audio circuit.

26. A switching power supply according to claim 25 wherein said third source of DC supply voltage is coupled to a vertical deflection circuit and supplies power thereto.

* * * * *